US 8,593,266 B2

(12) United States Patent
Robertson et al.

(10) Patent No.: US 8,593,266 B2
(45) Date of Patent: Nov. 26, 2013

(54) POWER LINE COMMUNICATION SYSTEM (75) Inventors: Mark Patrick Robertson, West Lothian (GB); Graeme Peter Hossack, Aberdeen (GB)

(73) Assignee: Oilfield Equipment Development Center Limited, Mahe, Victoria (SC)

( * ) Notice: Subject to any disclaimer, the term of this patent is extended or adjusted under 35 U.S.C. 154(b) by 1914 days.

(21) Appl. No.: 10/886,321

(22) Filed: Jul. 7, 2004

(65) Prior Publication Data

US 2004/0246108 A1    Dec. 9, 2004

Related U.S. Application Data (63) Continuation of application No. 10/030,363, filed as application No. PCT/GB00/02529 on Jun. 30, 2000, now abandoned.

(51) Int. Cl.
H04M 11/04 (2006.01)
(52) U.S. Cl.
USPC ........................................ 340/13.23
(58) Field of Classification Search
USPC ........... 340/310.11, 310.12, 310.13, 310.16, 340/310.17, 854.1, 854.3, 855.4, 856.4, 340/538.11, 12.33, 12.37, 12.38, 12.39, 340/13.32, 12.32
See application file for complete search history.

(56) References Cited

U.S. PATENT DOCUMENTS

| | | | |
|---|---|---|---|
| 3,340,500 A | 9/1967 | Boyd et al. | 340/18 |
| 3,716,719 A * | 2/1973 | Angelery et al. | 307/17 |
| 3,938,129 A | 2/1976 | Smither | 340/310 |
| 4,106,007 A | 8/1978 | Johnston et al. | 340/310 |
| 4,157,535 A | 6/1979 | Balkanli | 340/18 |
| 4,178,579 A | 12/1979 | McGibbeny et al. | 340/856 |
| 4,230,187 A | 10/1980 | Seto et al. | 166/362 |
| 4,365,506 A | 12/1982 | Hyde | 73/151 |
| 4,398,178 A | 8/1983 | Russ et al. | |
| 4,523,194 A | 6/1985 | Hyde | 340/856 |
| 4,556,864 A | 12/1985 | Roy | 340/310 |
| 4,568,933 A | 2/1986 | McCracken et al. | |
| 4,581,613 A | 4/1986 | Ward et al. | 340/856 |
| 4,593,559 A | 6/1986 | Brown et al. | |
| 4,620,189 A | 10/1986 | Farque | 340/856 |

(Continued)

FOREIGN PATENT DOCUMENTS

GB    562381 A    6/1944
GB    1500891 A    2/1978

(Continued)

OTHER PUBLICATIONS

PCT International Search Report dated Oct. 11, 2000, International Application No. PCT/GB00/02529.

(Continued)

*Primary Examiner* — Jennifer Mehmood
*Assistant Examiner* — Yong Hang Jiang
(74) *Attorney, Agent, or Firm* — Patterson & Sheridan, L.L.P.

(57) ABSTRACT

This invention relates to a power line communication (PLC) system wherein the power supply line supplies power and also acts as a communications supply line. A receiver is able to detect small changes in the modulated transmitted information and thereby shut down the circuit. The invention is particularly suitable for use where the IEL is remote from the power supply such as, for example, in down hole oil production situations where very long power cables are used.

25 Claims, 4 Drawing Sheets

(56) References Cited

U.S. PATENT DOCUMENTS

| | | | |
|---|---|---|---|
| 4,631,535 A | 12/1986 | Butlin | 340/856 |
| 4,631,536 A | 12/1986 | Ward et al. | 340/857 |
| 4,714,912 A | 12/1987 | Roberts et al. | 340/310 |
| 4,742,475 A * | 5/1988 | Kaiser et al. | 700/278 |
| 4,746,809 A | 5/1988 | Coleman et al. | |
| 4,862,157 A | 8/1989 | Noel | 340/825 |
| 4,901,070 A | 2/1990 | Vandevier | 340/856 |
| 5,264,823 A | 11/1993 | Stevens | |
| 5,349,644 A | 9/1994 | Massey et al. | |
| 5,491,463 A | 2/1996 | Sargeant et al. | 340/310 |
| 5,515,038 A | 5/1996 | Smith | 340/853.3 |
| 5,517,397 A * | 5/1996 | Quek et al. | 363/21.16 |
| 5,521,592 A | 5/1996 | Veneruso | 340/854.8 |
| 5,539,375 A * | 7/1996 | Atherton | 340/538.11 |
| 5,553,081 A | 9/1996 | Downey et al. | 371/6 |
| 5,554,968 A | 9/1996 | Lee | 340/310.01 |
| 5,566,879 A | 10/1996 | Longtin | 236/46 |
| 5,567,997 A | 10/1996 | Suzuki et al. | 307/127 |
| 5,572,182 A | 11/1996 | De Pinho Filho et al. | 340/310.02 |
| 5,581,229 A | 12/1996 | Hunt | 340/310.02 |
| 5,589,813 A | 12/1996 | Nielsen | 340/310.01 |
| 5,621,344 A | 4/1997 | Zierhut | 327/181 |
| 5,670,931 A | 9/1997 | Besser et al. | 340/310.01 |
| 6,194,996 B1 | 2/2001 | Okazaki et al. | 340/310.01 |
| 6,407,987 B1 | 6/2002 | Abraham | 370/295 |
| 6,529,120 B1 | 3/2003 | Bilenko et al. | 340/310.06 |

FOREIGN PATENT DOCUMENTS

| | | |
|---|---|---|
| GB | 2026747 A | 2/1980 |
| GB | 2113436 A | 8/1983 |
| GB | 2159377 A | 11/1985 |
| GB | 2310986 A | 9/1997 |

OTHER PUBLICATIONS

PCT International Preliminary Examination Report dated Oct. 17, 2001, International Application No. PCT/GB00/02529.

EPO Examination Report dated Feb. 24, 2003, European Application No. 00942234.6.

EPO Examination Report dated Jun. 26, 2003, European Application No. 00942234.6.

* cited by examiner

POWER LINE COMMUNICATION SYSTEM

RELATED APPLICATIONS

This application is a continuation of U.S. patent application Ser. No. 10/030,363 filed Jan. 2, 2002, which is the U.S. national phase of PCT Patent Application No. PCT/GB00/02529 filed Jun. 30, 2000, which claims priority of United Kingdom Application No. 9915298.5 filed Jul. 1, 1999.

FIELD OF THE INVENTION

The present invention relates to a power line communication system and method. More particularly, the present invention relates to a power line communications system wherein the power frequency in an inductive electric load (IEL) is used as a signal carrier. The invention is particularly suitable for use where the IEL is remote from the power supply such as, for example, in down hole oil production situations where very long power cables are used.

BACKGROUND OF THE INVENTION

Power line communication systems are generally well known. One known system modulates the current from a main power supply to signal between units located on a common supply. The power supply is also used to power the devices and any other electrical load on the line, for example, an electric motor. Their mode of operation is to draw a modulated current in addition to the load current drawn and by placing a transmitter across the supply in parallel to other devices/loads. Such systems are therefore suitable for fitting to existing power systems where such devices may be used as a transmitter/receiver. Such systems do not convey information about the load but use the communications capabilities of the existing power system. Systems where a receiver can detect information by looking at current flow on the cable are disclosed in U.S. Pat. No. 5,581,229, U.S. Pat. No. 5,589,813, U.S. Pat. No. 5,621,344 and U.S. Pat. No. 5,491,463.

Other systems which are known and which are suitable for use in downhole applications having a single power supply line pass information between units by coupling an additional carrier onto the power supply line. Information is passed via the current flow between each transmitter/receiver pair and the receiver is a load for the transmitted current. Systems using this principle are disclosed in U.S. Pat. No. 5,539,375, U.S. Pat. No. 4,620,189, U.S. Pat. No. 4,631,535, U.S. Pat. No. 4,631,536, U.S. Pat. No. 4,523,194, U.S. Pat. No. 4,157,535, U.S. Pat. No. 4,365,506, U.S. Pat. No. 4,178,579 and U.S. Pat. No. 3,340,500.

It is known that faults within a motor or other electrical load may change the time or frequency domain characteristics of a current drawn from a supply. This is due to the characteristics of the motor being altered due to the presence of faults. A source of such faults is short circuits between windings in an inductive (magnetically coupled) load. Such short circuits cause amplitude changes in the current and changes in the phase current cause imbalance in poly-phase machines. It is also known that mechanical faults in a rotor or bearing faults within a motor will cause changes in the frequency content of the current drawn by the motor. It is therefore possible to induce or mimic such faults to an extent that is not detrimental to the performance of the IEL to modulate a signal and thereby communicate information along a power line.

Previous methods used to provide communication devices are, for example, earthloop based communications. These types of devices ground a phase or neutral point through an impedance and communicate by passing a current around the formed loop, for example, down the phase cable and returned via earth. Such systems are susceptible to phase-to-earth faults. This can create a loss of communications and therefore cannot be used with earthed electrical systems.

IELs are commonly used where multiple loads are supplied from one power supply and each IEL's feed is not galvanically isolated from other IEL feeds. A disadvantage of this method is that all ground loop communications will fail if any of the IELs or their power feeds become grounded.

Other previously known methods require injection of a signal at the motor terminals using either direct, capacitive or inductive coupling techniques. A disadvantage of these types of methods is that if applied to a signal between phases rather than phase-to-earth, coupling is required between two motor terminals of potentially high voltage.

Previous communications systems have also been dependent as to whether the communication means is time-domain, digital or analogue, frequency keying, or amplitude or frequency or phase modulation.

Moreover, previous designs using earth loop communications have used various means of permitting insulation testing of the IEL whilst any communications device is fitted and rely on a high voltage switching relay or a negative biased high voltage diode. This is therefore a disadvantage as a special design is required to allow insulation testing.

Previous communications systems also require special high voltage filter or coupling devices to remove power frequencies which not only adds to the complexity and cost of the device, but also adds to its relative size.

Devices are well-known in the art which can be added to a power system, for example, in the home or office, wherein the devices are independent of the loads attached. These types of devices all modulate the current from a common main power supply. These devices draw a modulated current in addition to the load current being drawn by placing the transmitter across the electrical supply in parallel to any other load. It should be noted that these systems are not designed to convey information from the load, but to use the communications capabilities of the power system already in place and are of background relevance only.

It is therefore common for devices to require a dedicated source for communication between different units. The modulated AC or DC signal current is drawn from a coupled source voltage and not the general power supply voltage source. These previous types of devices therefore operate by filtering the power supply and passing information between units by coupling an additional carrier onto the power supply lines. Information is passed via a current flow between each transmitter/receiver pair on the bus.

It is an object of at least one aspect of the present invention to obviate/mitigate one or more of the aforementioned problems and disadvantages in the prior art.

It is a further object of the present invention to provide a remote IEL wherein the IEL is a transformer, inductor, motor or other such device of single phase or poly-phase construction.

It is yet a further object of the present invention to provide a remote IEL which overcomes the cost and complexity of an additional cable for communication purposes.

It is also an object of the present invention to provide an IEL device which due to the lack of an independent cable is suitable for submersible pumps used for mine, sump and quarry de-watering and downhole oil production situations where previously the length of cable to the pump and inaccessibility would incur a large cost of installation and maintenance.

It is yet a further object of the present invention to provide an IEL device which is independent of earthing and will continue to transmit whilst power is applied to the IEL.

Another object of the present invention is to provide a potential between two windings in an IEL, wherein the potential between the windings is lower than the potential applied to the IEL.

A further object of the present invention is to provide a point in an IEL which has a low potential to earth (the neutral point of an earth neutral system or the neutral of an unearthed, fault-free poly-phase system) wherein there is a lack of high electrical stress from any of the components to earth potential under normal operating conditions.

Furthermore, it is an object of the present invention to provide information as a constituent of a power flow to an IEL. Information can therefore be communicated at all times that the IEL is powered.

It is a further object of the present invention to provide a secondary supply of lower potential wherein the secondary supply continues to modulate a powerflow, enabling information to be carried even though the secondary supply is incapable of powering the IEL.

Moreover, it is an object of the present invention to provide a system of transferring information which is a constituent of a power flow to an IEL which is unaffected by ground faults.

A yet further object of the present invention is to provide a system for transferring information which is a constituent of a power flow to an IEL wherein a receiver located on a feed to each IEL can easily detect a signal from each transmitter. Alternatively, it is a further object to provide a single receiver located on a common feed to all IELs, wherein the receiver filters out each of the signals being transmitted.

A further object of the present invention is to provide a method of transferring information as a constituent of a power flow which is independent of the modulation method. Moreover, it is an object that a plurality of signals are transmitted from one modulating transmitter and that more than one transmitter communicates per current drawn from the source.

It is a further object of the present invention to provide a method of transferring information as a constituent of a power flow wherein the system is independent of any galvanic isolation/connection of the electrical system or IEL to earth and as such needs no special design to permit insulation testing.

A further object of the present invention is to provide a method of transferring information as a constituent of a power flow wherein the system is capable of being installed in voids within an IEL as long as access to two windings of the IEL are available.

SUMMARY OF THE INVENTION

According to one aspect of the present invention there is provided a power line communications system including a power supply, a power line, a transmitter means, an IEL and a receiver means, wherein in use, information is transmitted from the transmitter means to the receiver means via the IEL on a power signal by the transmitter means modulating at least one characteristic of the IEL.

Preferably, the characteristics of the IEL which are altered include resistance, inductance and/or capacitance of any primary and/or secondary transformers, or a motor stator or rotor winding.

Preferably, multiple transmitter means are used with each transmitter means using a different modulation technique.

Advantageously, multiple transmitter means are used with each transmitter means using the same modulation technique, but each having different modulation modes within that technique.

It is preferred that the modulation is effected by an amplitude modulation technique.

Preferably, the amplitude modulation technique modulates the characteristics of the IEL such that changes in amplitude of the current or voltage in the power line can be detected.

Preferably, said transmitter means for modulating the characteristics of the IEL comprises a modulation frequency generator. Desirably said transmitter means is connected directly to the IEL.

It is preferred that the receiver means is able to filter out and recover the transmitted information.

Preferably, the receiver means is placed anywhere on the power line supplying power to the IEL and measures the power flow to the IEL and, with a de-modulator, measures the level of modulation of the power flow to the IEL created by the transmitter means wherein the de-modulated signal is the information being transmitted.

Preferably, impedance and thereby leakage current between any two windings within an IEL is modulated by the transmitter means to achieve the required power flow modulation.

Preferably, impedance and thereby leakage current between a plurality of windings within an IEL is modulated to achieve the required power flow modulation.

It is preferred that the communicated information is contained within a sequence of modulations created by the transmitter means which are de-modulated and reconstructed by the receiver means to recover the fully transmitted message.

Preferably, multiple consecutive or concurrent modulations occur in the same positive or negative half of current flow to the inductive electric load.

It is preferred that the power supply is not dedicated to communications and is principally intended for supplying power to the IEL except and where the main power supply is removed to cease operation of the IEL.

A secondary supply such as an AC or DC supply may be used with the intention of operating the communications system only.

Preferably, where the impedance is modulated the current flow therethrough is not rectified so as to provide a modulated power flow in both the positive and negative half-cycles of the current flow to the inductive electric load.

Advantageously, a current detection circuit is used to determine the zero crossing of a current flow to an inductive electric load in order that the modulation is activated only at pre-determined points of current flow.

A preferred feature is that the modulation time period is limited to a known pre-set value to reduce the power loss within the modulation circuit.

Preferably, the modulation is controlled by the temperature and power losses within the modulation circuit.

Preferably, the modulation time period is triggered to occur only at times of reduced current flow to the inductive load thereby reducing the power loss within the modulation circuit.

Preferably, the modulation time period is triggered to occur only at times of reduced voltage applied to the inductive electric load thereby reducing the power loss within the modulation circuit.

It is preferred that the transmitter includes a circuit similar to the receiver to provide feedback on the background noise at the modulation mode wherein the transmitter will actively alter the modulation technique or mode.

Moreover, it is preferred that the receiver includes a circuit to sweep modulation modes in order to detect if the transmitter has modified the modulation modes in order to increase the signal to noise ratio.

Furthermore, it is preferred that a voltage detection circuit is used to determine the zero crossing of the voltage applied to the IEL in order that modulations are activated only at fixed periods on the voltage waveform.

According to a second aspect of the present invention there is provided a method for transmitting information on a power line communications system including a power supply, a power line, a transmitter, an IEL and a receiver, wherein in use, information is transmitted from the transmitter to the receiver via the IEL on a power supply by modulating at least one characteristic of the IEL.

According to a third aspect of the present invention there is provided a PLC system according to the first and second aspects of the invention for use as an over-temperature system in a pump used for mine, pump and quarry de-watering and oil production.

BRIEF DESCRIPTION OF THE DRAWINGS

Further preferred features and advantages of the present invention will now be described by way of example of some preferred embodiments illustrated with reference to the following drawings in which.

DETAILED DESCRIPTION OF THE PREFERRED EMBODIMENTS

Figure 1:
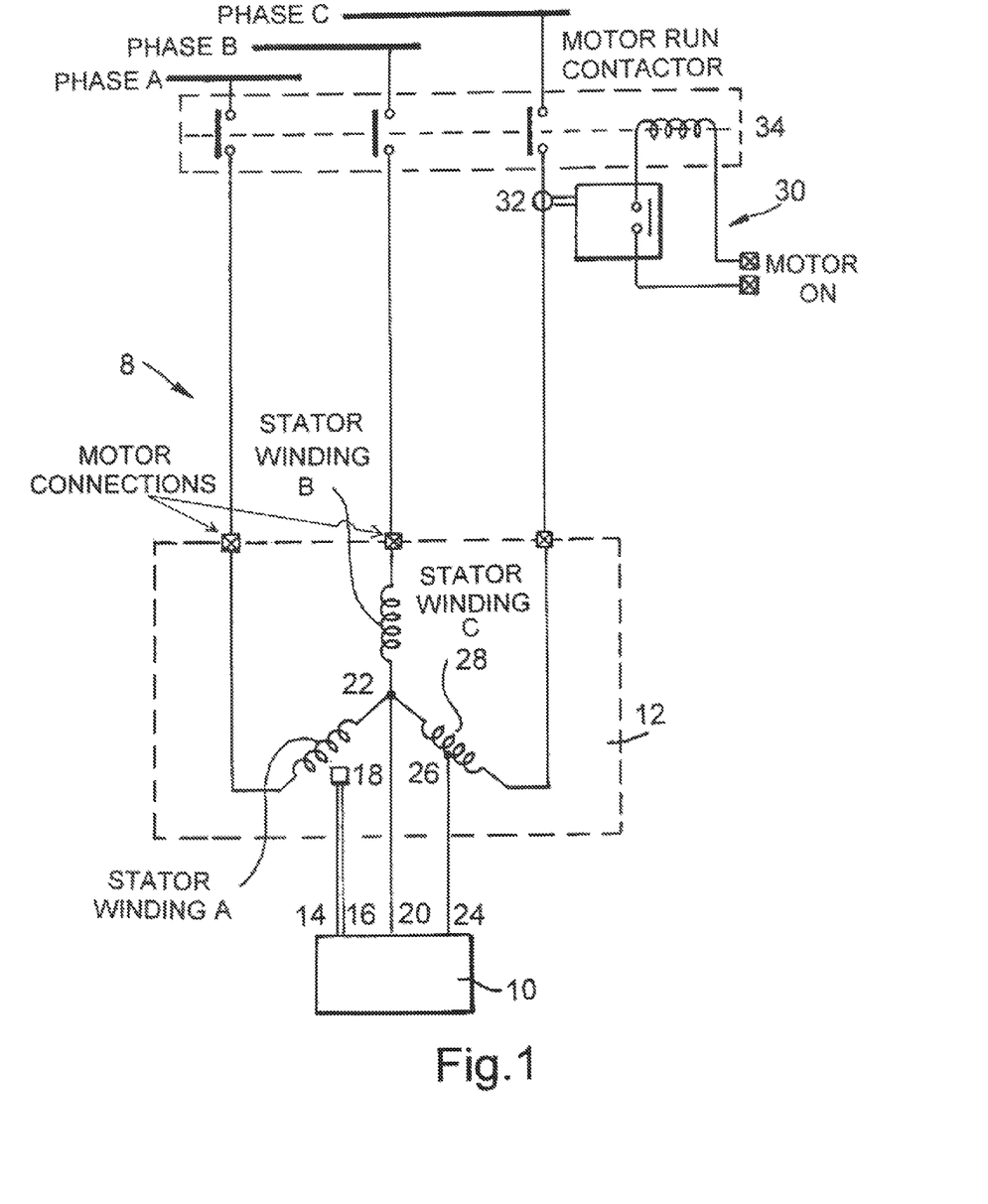
FIG. 1 is an electrical system diagram of a power line transmission system according to the invention.

In FIG. 1 is shown an over-temperature system 8 wherein there is a transmitter 10 connected to a three-phase, star wound induction motor 12 with 300 windings per phase and a phase to phase voltage requirement of 440 V AC rms.

The transmitter trigger input 14, 16 is connected to a normally open motor thermistor 18, in phase A, and a first modulation input 20, is connected to a neutral point 22 of the motor 12.

A second modulation input 24 is connected to a turn 26 of stator winding 28. To achieve a certain signal to noise ratio, turn 26 is the 270th turn in the stator winding 28, causing a voltage across the neutral point 22 and turn 26 of approximately 25.4 V AC rms.

A receiver 30 is located close to the power source. The receiver 30 has a current transformer 32 which is clamped around the same phase to that of the transmitter's second modulation input 24. In FIG. 1 the modulation input 24 is in Phase C.

Figure 2:
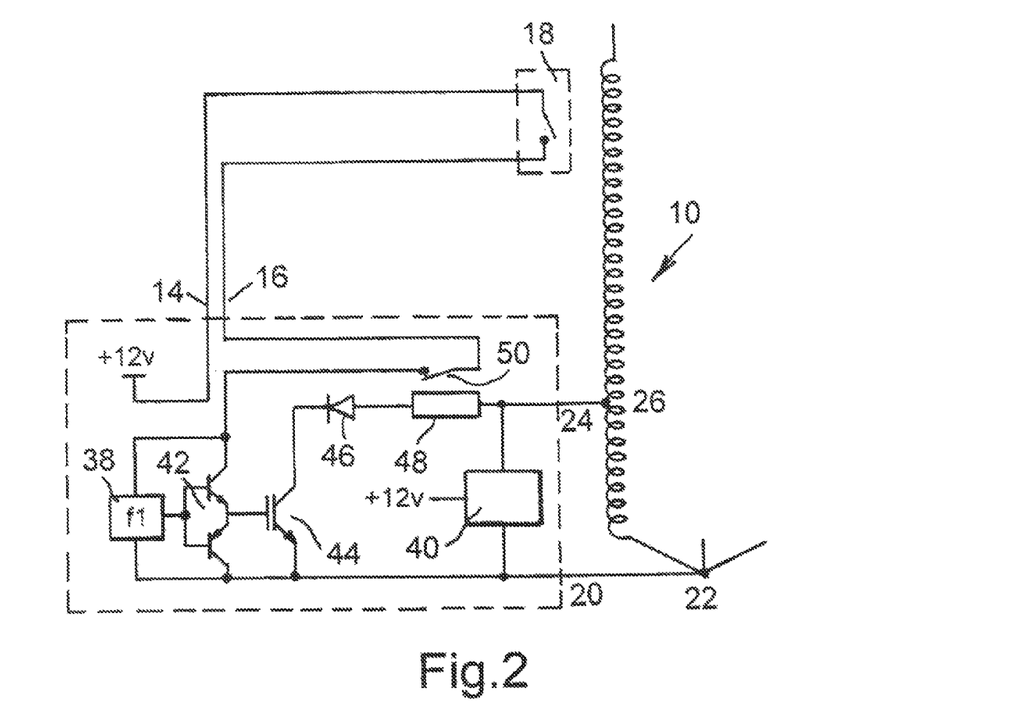
FIG. 2 is a detailed circuit diagram for a transmitter for use in the system shown in FIG. 1.

As shown in FIG. 2, the transmitter 10 comprises a modulation frequency generator 38 providing frequency f1, a power supply 40 connected across the modulation inputs 20, 24, an amplifier 42 to drive a main modulating IGBT 44, a rectifier diode 46, a current limiting resistor 48 and a normally closed over-temperature thermistor 50 for the transmitter 10.

Figure 3:
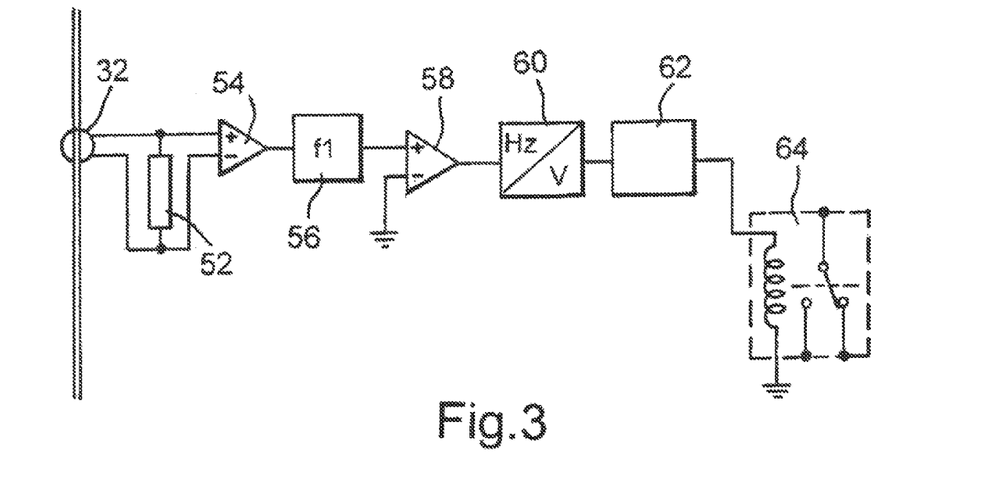
FIG. 3 is an outline circuit diagram for a receiver for use in the system shown in FIG. 1.

As shown in FIG. 3, the receiver 30 comprises the current transformer input 32 and a load resistor 52 with a differential amplifier 54 feeding a bandpass filter 56 set with a frequency of f1 (the modulation frequency of the transmitter). Output from the filter 56 is passed to a comparator 58 to drive a frequency to voltage converter 60 which operates a relay driver circuit 62. A standard latching time delay relay 64 is used to latch and hold for a pre-set time period whenever a signal is detected from the transmitter 10.

Figure 4:
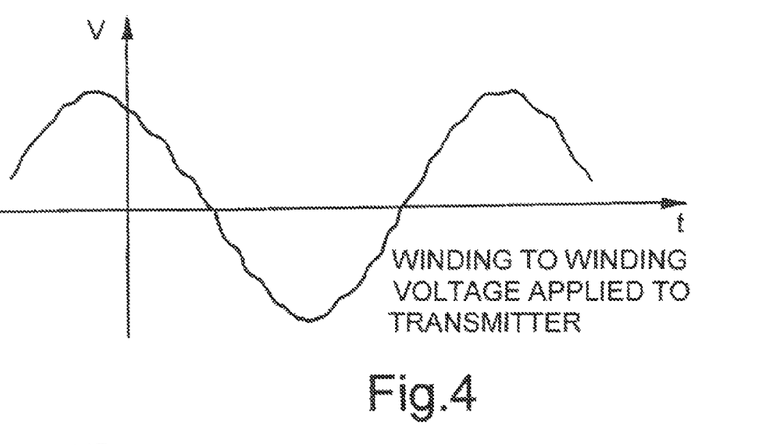
FIG. 4 is a typical voltage waveform generated across two windings within a single phase of a three-phase motor.

When the motor 12 is operating at a temperature which does not close the motor thermistor 18, the IGBT 44 is in the off position and there is no flow via the modulation circuit. The waveform across the modulation circuit is shown in FIG. 4.

Figure 5:
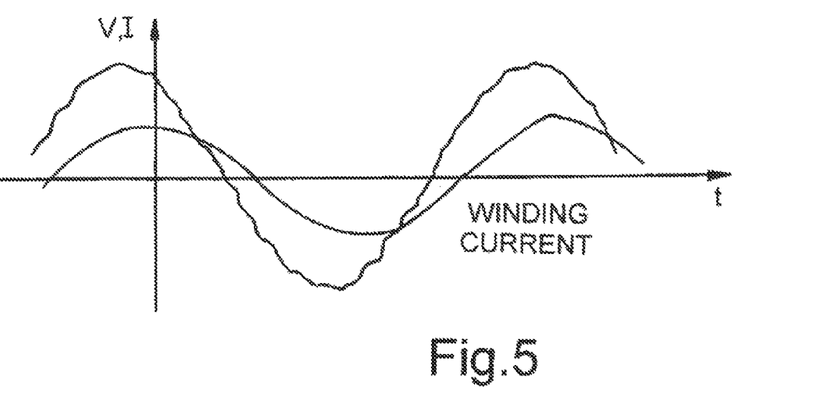
FIG. 5 is as FIG. 4 with the phase windings current waveform superimposed, showing the inductive phase relationship causing a current to voltage lag.

As shown in FIG. 5, at the receiver 30, the voltage across the load resistor 52 is proportional to the total current flow.

Figure 6:
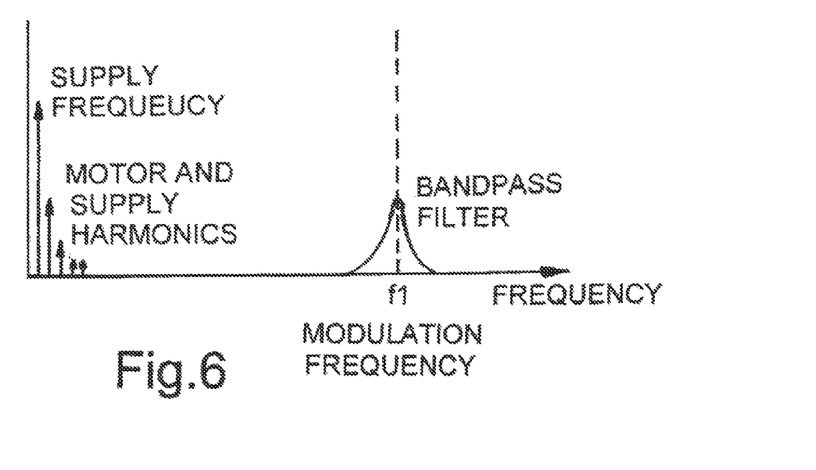
FIG. 6 is a typical frequency spectrum for the current waveform shown in FIG. 5, showing the location of the bandpass filter with no motor frequency components within the bandpass region.

In FIG. 6, a frequency spectrum is shown which contains the fundamental power frequency and any harmonics. The bandpass filter 56 removes the components of this voltage not at or near the modulation frequency and the comparator 58 is switched off as the filter 56 output becomes too low. The relay 64 remains de-activated.

Figure 7:
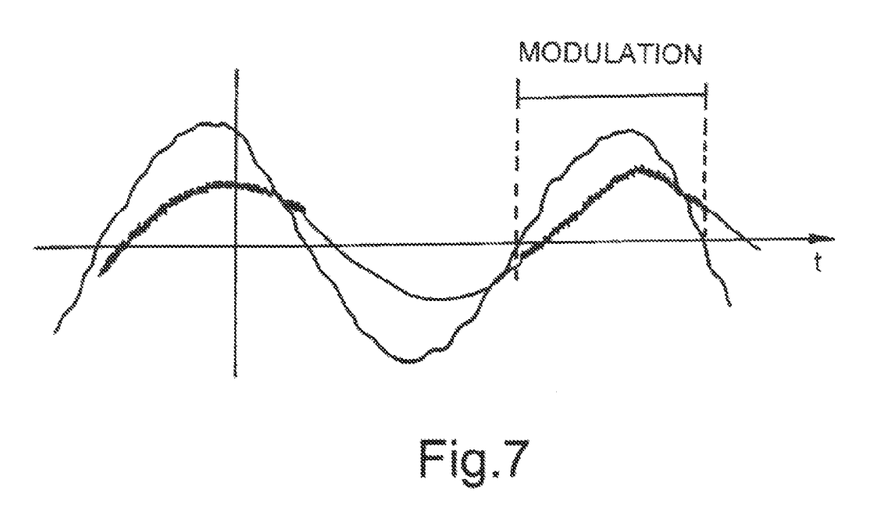
FIG. 7 is as FIG. 5 with the addition of a modulated additional current flow during the time period where the voltage is positive.

FIG. 7 shows in addition to that of FIG. 5 a modulated additional current flow during the time period where the voltage is positive.

Figure 8:
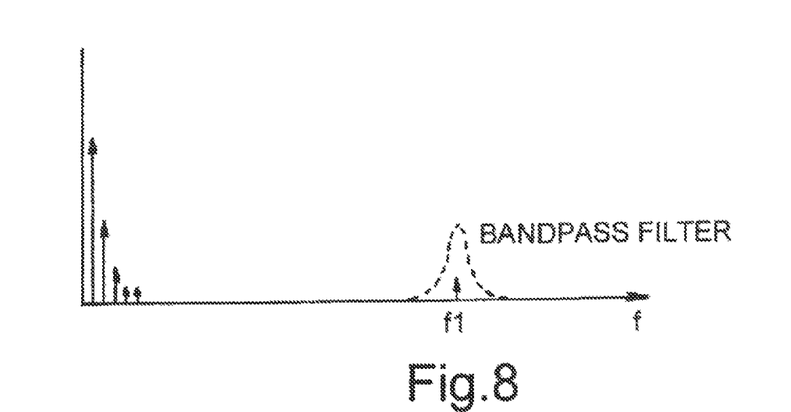
FIG. 8 is as FIG. 6 but shows the time period where modulation is on (as detailed in FIG. 7) and shows the additional frequency component at the modulation f1.

FIG. 8 shows in addition to that shown in FIG. 6, the time period where modulation is on an additional frequency component at modulation f1.

If the motor 12 overheats, the motor thermistor 18 closes and both the frequency generator 38 and the drive circuit for the IGBT 44 become powered. Accordingly, the output of the modulation frequency generator 38 will drive the IGBT drive circuit 42 which will cause the IGBT 44 to be modulated and to conduct at frequency f1. During the period the IGBT 44 is conducting and the waveform across the transmitter terminals 20, 24 is positive, there will be current flow through the modulation circuit, limited to a value set by resistor 48. This causes reduction in apparent winding impedance creating a decrease in overall winding impedance and thereby an increase in current flow. This increase in current flow is modulated on and off by the IGBT 44 at frequency f1. Should the IGBT 44 or the limit resistor 52 overheat, either of the thermistors 18, 50 will switch off the modulation circuit and allow these devices to cool. Upon cooling, the modulation will occur again.

At the receiver 30, this modulated increase in current flow is converted to a modulated voltage across the load resistor 52 and into the bandpass filter 56. The filter input now has a spectrum that contains both the fundamental power frequency and harmonics and a spectral component at the modulation frequency. The bandpass filter 56 removes all but the modulation frequency causing a voltage input to the comparator 58. The comparator 58 outputs a frequency to the frequency to voltage converter. A voltage is output by the frequency to voltage converter to the relay driver 64 that will activate the latching relay thereby indicating motor 12 is over-temperature. Should the transmitter 10 shut down due to over-temperature, the relay 64 will remain latched. Additionally, should the relay 64 be used to shut down the motor 12 in an over-temperature state will remain latched to prevent restart until the relay 64 has timed out.

Alternatives of the above may be used when any number of transmitters modulate leakage resistance between two windings in a motor using a frequency modulation technique. The leakage resistance between two windings is altered at a modulation frequency, two or three orders of magnitude above the power supply frequency between the characteristic leakage resistance and a lower preset value. Although at the lower pre-set value of resistance some motor current bypasses the windings and thereby reduces the magnetising effect of the winding causing a change in the current drawn by the motor this results in the power flow to the IEL having a frequency content at the modulation frequency should the transmitter be on. The receiver is, for example, a current transformer around a power supply conductor wherein the output of the current transformer is passed through a bandpass filter to remove frequencies outside that of the transmitter's modulation frequency. If the output of the bandpass filter rises above a certain threshold value, then the transmitter is activated into an on position.

In any alternative embodiments, in order to achieve the required signal to noise ratio, the value of the modulated resistance and the proportion of the windings between which the invention is placed may be altered.

The present invention is particularly suitable for submersible pumps used for mine, sump and quarry de-watering and oil production where previously the length of the necessary communication cable to the pump and inaccessibility resulted in significant inconvenience and added cost to the device.

Various modifications may be made to the above described embodiment without departing from the scope of the present invention. Moreover the present invention is not restricted to use on new motors and pumps, as original equipment, but also lends itself to retro-fitting to completed motors already in use.

The invention claimed is:

1. A power line communications (PLC) system, comprising:
   a power line,
   an electric motor having a set of windings,
   a power supply for powering the motor,
   a transmitter, and
   a receiver,
   said transmitter being operable to transmit information to the receiver on a power signal by modulating a leakage current between two turns of the set of motor windings.

2. A PLC system according to claim 1, wherein multiple transmitters are used with each transmitter using a different modulation technique.

3. A PLC system according to claim 1, wherein multiple transmitters are used with each transmitter using the same modulation technique, but each having different modulation modes within that technique.

4. A PLC system according to claim 1, wherein the modulation is effected by an amplitude modulation technique.

5. A PLC system according to claim 1, wherein the receiver is able to filter out and recover the transmitted information.

6. A PLC system according to claim 1, wherein the transmitted information is contained within a sequence of modulations from the transmitter which are de-modulated and reconstructed by the receiver to recover a fully transmitted message.

7. A PLC system according to claim 6, wherein multiple consecutive or concurrent modulations occur in the same positive or negative half of current flow to the motor.

8. A PLC system according to claim 1, wherein a current flow through a modulated impedance is not rectified to provide modulated power flow in both positive and negative half-cycles of a current flow to the motor.

9. A PLC system according to claim 1, wherein a current detection circuit is used to determine a zero crossing of a current flow to the motor in order that the modulation is activated only at pre-determined points of current flow.

10. A PLC system according to claim 1, wherein a modulation time period is limited to a known pre-set value to reduce power loss within the modulation circuit.

11. A PLC system according to claim 1, wherein the modulation is controlled by temperature and power losses within the modulation circuit.

12. A PLC system according to claim 1, wherein a modulation time period is triggered to occur only at times of reduced current flow to the motor by reducing power loss within the modulation circuit.

13. A PLC system according to claim 1, wherein a modulation time period is triggered to occur only at times of reduced voltage applied to the motor thereby reducing power loss within the modulation circuit.

14. A PLC system according to claim 1, wherein:
   the transmitter includes a circuit to provide feedback on background noise at a mode of the modulation, and
   the transmitter is operable to actively alter the modulation mode or a technique of the modulation.

15. A PLC system according to claim 14, wherein the receiver includes a circuit to sweep modulation modes in order to detect if the transmitter has modified the modulation mode in order to increase signal to noise ratio.

16. A PLC system according to claim 1, further comprising a voltage detection circuit to determine a zero crossing of voltage applied to the motor in order that modulations are activated only at fixed periods on a voltage waveform.

17. A PLC system as claimed in claim 1 wherein the two turns are in a single phase of the set of windings.

18. A PLC system as claimed in claim 1 wherein the two turns are selected close to the null point of the motor.

19. A PLC system as claimed in claim 1 wherein a proportion of total turns between the said two turns is selected in order to achieve a predetermined signal to noise ratio.

20. A PLC system according to claim 1, wherein the power flow supply is constant.

21. A PLC system according to claim 1, wherein a current flow through a modulated impedance is rectified to only provide modulated power flow in one half-cycle of the current flow to the motor.

22. A system for mine, sump, and quarry dewaterinq or oil production, comprising:
   a PLC system according to claim 1, wherein the motor, the transmitter, and the power line are submersible, and
   a submersible pump coupled to the motor for being driven thereby.

23. A power line communications (PLC) system, comprising:
   a power line,
   an electric motor having windings,
   a power supply for powering the motor,
   a transmitter, and
   a receiver,
   the transmitter being operable to transmit information to the receiver on a power signal by modulating a leakage current between two windings of a set of windings of the motor.

24. A PLC system according to claim 1, further comprising a thermistor in communication with the motor.

25. A PLC system according to claim 24, wherein the thermistor is operable to activate the transmitter in response to overheating of the motor.

\* \* \* \* \*